Dec. 8, 1925.

K. J. E. HESSELMAN

VALVE CONTROLLING MEANS

Filed Aug. 22, 1924

1,564,849

Inventor,
Knut J. E. Hesselman
By Henry Orth Jr.
Atty.

Patented Dec. 8, 1925.

1,564,849

UNITED STATES PATENT OFFICE.

KNUT JONAS ELIAS HESSELMAN, OF SALTSJO-STORANGEN, SWEDEN.

VALVE-CONTROLLING MEANS.

Application filed August 22, 1924. Serial No. 733,597.

*To all whom it may concern:*

Be it known that I, KNUT JONAS ELIAS HESSELMAN, a citizen of the Kingdom of Sweden, residing at Saltsjo-Storangen, Sweden, have invented new and useful Improvements in Valve-Controlling Means, of which the following is a specification.

It is already known to control valves and the like by means of bellows which are compressed by an increase of the external pressure or enlarged by an increase of the internal pressure. In case of low pressure such bellows are usually formed as a corrugated tube while in case of high pressures, a design of bellows has been proposed the resilient part of which comprises resilient annular disks rigidly connected to each other alternately at their inner and outer edges.

This invention has for its object to provide an improved design of bellows adapted for high pressures which may be made more compact and is less expensive than the known structure above referred to.

The invention is characterized, chiefly, by the fact that the design of bellows comprises a set of independent annular disks loosely engaging each other at their inner or outer edges, or alternately at their inner and outer edges, said disks being clamped within a casing subjected to the working pressure between a fixed and a movable end piece one of which closes one end of the hollow column formed by the disks while the other end piece is formed with a passage leading to the interior of said hollow column.

In the accompanying drawings are illustrated several embodiments of the invention.

Figure 5:
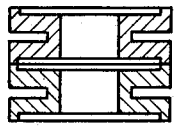
Figure 6:
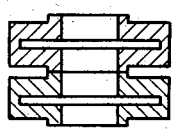
Figure 1:
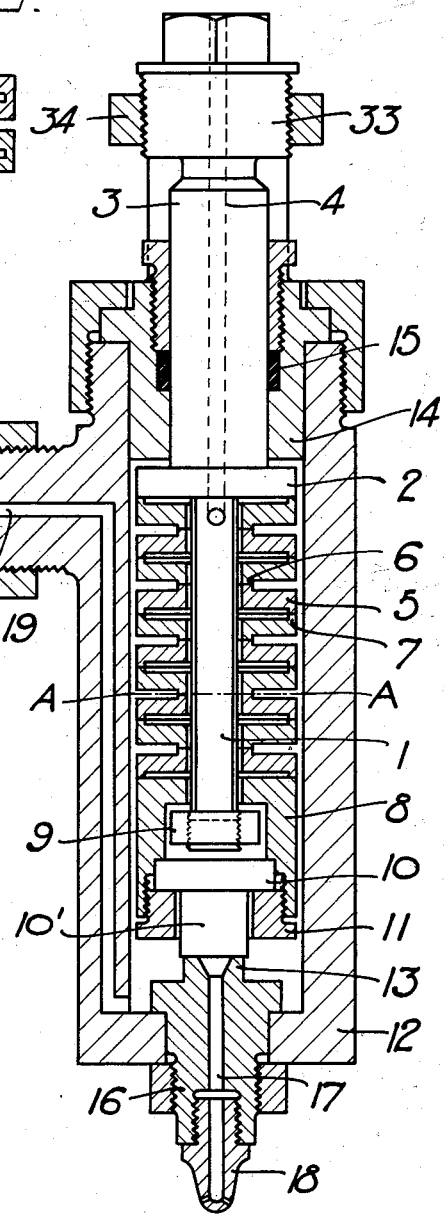
Figure 2:
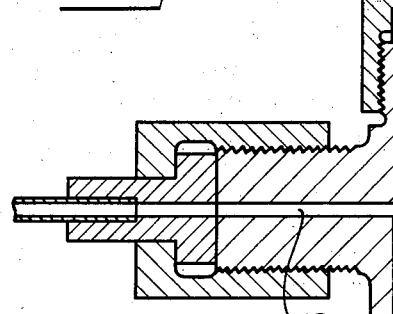
Figure 3:
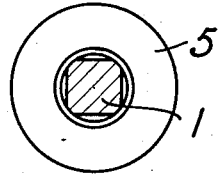
Figure 4:
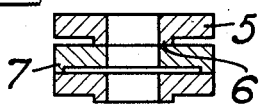
Figure 4:
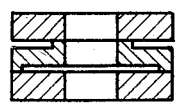

Fig. 1 is a longitudinal section of a fuel valve having a design of bellows according to one embodiment of the invention. Fig. 2 is a section on the line A—A of Fig. 1. Fig. 3 is a section of a plurality of resilient disks of a design of bellows according to a second embodiment. Fig. 4 is a section of a plurality of disks of a design of bellows according to another modified embodiment of the invention. Figs. 5 and 6 are similar sections of still further embodiments.

In the embodiment shown in Figs. 1 and 2, 1 is a bolt having a rigid shoulder or stop 2 at one end. On the upper side of said shoulder or stop there is a stem 3 formed integral with said stop. Formed in said stem 3 is a passage 4 extending from the upper end of the stem 3 to a point of the bolt 1 below the stop 2.

Disposed on the bolt 1 are a plurality of annular resilient or flexible disks 5 each of which is formed with an elevated rib 6 at the inner edge of one of its surfaces and with a similar rib 7 at the outer edge of its opposite surface. The disks 5 are so positioned as to cause the inner rib of each disk to engage the inner rib of one adjacent disk and the outer rib 7 of each disk to engage the outer rib of the other adjacent disk, thereby giving rise to alternately inwards and outwards opening grooves between the various disks as shown in the drawing. On the bolt 1 below the lowermost disk 5 is a sleeve shaped end portion or stop 8. The end of the bolt extending below said sleeve 8 is screw-threaded and carries a nut 9 to hold the parts above described assembled to form a unitary structure. The bolt 1 is shown in Fig. 2, as substantially square shaped so as to produce spaces between itself and the inner edges of the disk 5 while at the same time affording proper guidance for the disks so as to prevent the latter from lateral movements.

The end portion 8 carries, as shown, the means, as a valve or a valve controlling member 10, to be controlled by the bellows. The member 10 is clamped by means of a threaded plug 11 in the sleeve shaped member so as to gas-tightly close same. The tightening of the nut 9 is adjusted so as to cause the disks 5 to closely engage each other as well as the end portions or stops. The structure as a whole will thus enclose a chamber communicating with the outside exclusively through the passage 4.

The structure thus far described is shown as inserted into the casing 12 of the fuel valve of an internal combustion engine in such a way that an extension 10' of the member 10 bears upon a valve seat 13 while the stem 3 extends through the cover 14 of the valve casing and through a packing 15 inserted in said cover. The extending end of the stem 3 bears against a screw 33 threaded into a cross piece 34 rigidly attached to the valve casing. By means of the screw 33 the initial compression of the disk set and thus the pressure at which the valve opens may be varied. The valve seat is formed in a plug 16 closing one end of the valve casing, said plug having also a fuel passage 17 leading from said valve seat and to a fuel nozzle 18 carried by said plug at the outermost end thereof. The valve casing 12 is formed with an inlet 19 for liquid fuel, the admission of which to an internal combustion engine is to be controlled by the valve. The fuel inlet 19 communicates with the valve casing chamber surrounding the bellows formed by the disks 5, so that the bellows will be externally subjected to the pressure existing in said chamber and internally to the atmospheric pressure through passage 4.

The liquid fuel supplied under pressure through passage 19 acts on the lower side of the members 10, 11 as well as in the outer grooves between the disks 5 and tends to compress the set of disks. When the pressure above atmospheric resulting from the fuel inside the valve casing exceeds the pressure corresponding to the compression of the disk set by means of the screw 33, the set of disks will be further compressed causing the end members 8, 10, 11 to perform a movement corresponding to said compression, thereby removing the valve body 10' from its seat 13.

Due to the free engagement between the flexible disks a considerably greater flexibility will be obtained than would be obtained if the disks were rigidly connected together, so that a determined total flexibility may be obtained for a certain power with a structure of less dimensions and for considerably less expense than heretofore. An appreciable reduction of the costs of manufacture will also be obtained as a result of the simple method of manufacture and assembling of the set of disks.

In the embodiment above described each flexible disk is formed with one inner and one outer peripheral rib. The shape of the disks, however, may be varied in several ways without departing from the principles of the invention. In Figs. 3 and 4, two different modified designs of disks are illustrated.

Fig. 3 shows disks 5 which are all plane on one side having alternate inner and outer ribs 6 and 7, respectively, on the other side.

In Fig. 4 every second disk is plane on both of its sides and the remaining disks are each formed with an inner rib on one side and with an outer rib on the other side.

It is to be noted that the disks must not necessarily engage each other at both their inner and outer edges. If desired, the disks may contact at their inner and outer edges only. In such case the disks are formed with outer and inner grooves, respectively, as shown in Figs. 5 and 6.

What I claim is:—

1. In a fluid pressure operated valve controlling device, a set of annular flexible disks loosely engaging each other to form a longitudinally flexible hollow column, a carrier for said disks, a rigid end piece on said carrier at one end of the set of disks, an adjustable end piece on said carrier at the opposite end of said set of disks, and means carried by one end piece and engaging the other end piece to hold said parts together so as to cause them to form a unitary structure containing a closed chamber communicating with the atmosphere through a passage in one of said end pieces.

2. In a fluid pressure operated valve controlling device, a set of annular flexible disks loosely engaging each other to form a longitudinally flexible hollow column, a bolt extending through the openings of said disks to carry same, a rigid end piece on said bolt outside one end of the set of disks, a slidably mounted end piece on said bolt outside the opposite end of said set of disks, and a nut on said bolt outside said movable end piece to hold the bolt and disks together so as to cause them to form a unitary structure having a closed chamber communicating with the atmosphere through a passage formed in said rigid end piece.

3. In a fluid pressure operated valve controlling device, a set of annular flexible disks loosely engaging each other to form a longitudinally flexible hollow column, a bolt extending through the openings of said disks to carry same, said bolt forming an internal guiding member for the disks without filling the openings thereof, a rigid end piece on said bolt outside one end of the set of disks, a slidably mounted end piece on said bolt outside the other end of the set of disks, and a nut on said bolt outside said movable end piece to hold the bolt and disks together so as to cause them to form a unitary structure having a closed chamber communicating with the atmosphere through a passage formed in said rigid end piece.

4. In a fluid pressure operated valve controlling device, a set of annular flexible disks loosely engaging each other to form a longitudinally flexible hollow column, a bolt extending through the openings of said disks to carry same, a rigid end piece on said bolt outside one end of the set of disks, means on said disks to prevent lateral displacement of the disks relatively to each other and to said end piece, a slidably mounted end piece on said bolt outside the other end of the set of disks, and a nut on said bolt outside said movable end piece to hold the bolt and disks together so as to cause them to form a unitary structure having a closed chamber communicating with the atmosphere through a passage formed in said rigid end piece.

5. In a fluid pressure operated valve controlling device, a closed chamber adapted to be subjected to the said fluid pressure, a valve seat at one end of said chamber, a valve body adapted to engage said seat, a carrier for said valve body, a bolt slidably engaging said carrier, a nut on said bolt adapted to limit the relative movement of said bolt and carrier, a set of annular flexible disks on said bolt so that the latter extends through the openings of said disks to guide them laterally without filling the openings thereof, a rigid end piece on said bolt outside the uppermost disk thereon, said disks loosely engaging each other alternately at their inner and outer edges, said rigid end piece having a passage forming communication between the atmosphere and the space formed inside the set of disks.

In testimony whereof I have signed my name.

KNUT JONAS ELIAS HESSELMAN.